(12) United States Patent
Estes

(10) Patent No.: US 8,987,924 B2
(45) Date of Patent: Mar. 24, 2015

(54) SELF-TUNING ENERGY HARVESTER

(71) Applicant: Robert Alan Estes, Tomball, TX (US)

(72) Inventor: Robert Alan Estes, Tomball, TX (US)

(73) Assignee: Baker Hughes Incorporated, Houston, TX (US)

( * ) Notice: Subject to any disclaimer, the term of this patent is extended or adjusted under 35 U.S.C. 154(b) by 83 days.

(21) Appl. No.: 13/788,516

(22) Filed: Mar. 7, 2013

(65) Prior Publication Data
US 2013/0234445 A1 Sep. 12, 2013

Related U.S. Application Data

(60) Provisional application No. 61/607,632, filed on Mar. 7, 2012.

(51) Int. Cl.
| | |
|---|---|
| F02B 63/04 | (2006.01) |
| F03G 7/08 | (2006.01) |
| H02K 7/18 | (2006.01) |
| H02N 2/18 | (2006.01) |
| H02N 1/08 | (2006.01) |
| H02K 35/02 | (2006.01) |
| H02P 9/02 | (2006.01) |

(52) U.S. Cl.
CPC ............... *H02N 2/188* (2013.01); *H02N 1/08* (2013.01); *H02K 35/02* (2013.01); *H02K 7/1876* (2013.01); *H02P 9/02* (2013.01)
USPC ........................................................ 290/1 R

(58) Field of Classification Search
CPC ........... H02N 2/188; H02N 1/08; H02N 2/18; H02K 35/02; H02K 7/1876; H02K 7/18; H02P 9/02; E21B 41/0085

USPC .................. 290/1 R, 7; 310/339, 300, 25
See application file for complete search history.

(56) References Cited

U.S. PATENT DOCUMENTS

| | | |
|---|---|---|
| 4,387,318 A | 6/1983 | Kolm et al. |
| 6,285,489 B1 | 9/2001 | Helsel et al. |
| 6,504,258 B2 | 1/2003 | Schultz et al. |
| 6,538,799 B2 | 3/2003 | McClelland et al. |
| 6,858,970 B2 | 2/2005 | Malkin et al. |
| 7,488,887 B2 | 2/2009 | Mori |
| 7,626,316 B2 | 12/2009 | Kozinsky et al. |
| 7,986,076 B2 | 7/2011 | Yoon et al. |

(Continued)

FOREIGN PATENT DOCUMENTS

JP          2005312269 A     11/2005

OTHER PUBLICATIONS

International Search Report and Written Opinion for PCT Application No. PCT/US2013/029339, dated Jun. 27, 2013, pp. 1-9.

(Continued)

*Primary Examiner* — Javaid Nasri
(74) *Attorney, Agent, or Firm* — Cantor Colburn LLP

(57) ABSTRACT

An apparatus for generating electricity includes a flexural member configured to flex upon being subject to a vibration. A plurality of weight displacement systems is disposed at the flexural member, each weight displacement system in the plurality being configured to displace a moveable weight upon receipt of a signal. A processor is configured to provide a signal to each weight displacement system in order to achieve a desired resonant frequency of the flexural member. And, an electricity generating device is coupled to the flexural member and configured to generate the electricity upon flexing of the flexural member.

19 Claims, 5 Drawing Sheets

(56) References Cited

U.S. PATENT DOCUMENTS

| | | |
|---|---|---|
| 8,072,122 B2 | 12/2011 | Gao et al. |
| 2006/0071578 A1 | 4/2006 | Drabe et al. |
| 2008/0074002 A1 | 3/2008 | Priya et al. |
| 2009/0134631 A1 | 5/2009 | Guerrero et al. |
| 2009/0166045 A1* | 7/2009 | Wetzel et al. ............... 166/381 |
| 2009/0195222 A1 | 8/2009 | Lu et al. |
| 2010/0033142 A1 | 2/2010 | Roberts et al. |
| 2010/0072759 A1 | 3/2010 | Andosca et al. |
| 2010/0164711 A1 | 7/2010 | Arms et al. |
| 2011/0156533 A1 | 6/2011 | Morris et al. |
| 2011/0187207 A1 | 8/2011 | Arnold et al. |
| 2012/0212100 A1 | 8/2012 | Lee |

OTHER PUBLICATIONS

Challa et al., "A vibration energy harvesting device with bidirectional resonance frequency tunability", Smart Mater, Stud. 17 (2008), pp. 2-11.

Zhu et al., "Strategies for increasing the operating frequency range of vibration energy harvesters: a review", Meas. Sci. Technol. 21 (2010), pp. 1-29.

* cited by examiner

SELF-TUNING ENERGY HARVESTER

CROSS-REFERENCE TO RELATED APPLICATION

This application is a Non-Provisional Application of U.S. Provisional Patent Application No. 61/607,632 filed Mar. 7, 2012, the disclosure of which is incorporated by reference herein in its entirety.

BACKGROUND

Geologic formations can have many uses such as hydrocarbon production, geothermal production, and carbon dioxide sequestration. Logging tools are conveyed through boreholes penetrating the formations in order to perform measurements related to an intended use of the formation. Typically, the logging tools include sensors, transducers and/or transponders used in performing and processing the measurements. These devices generally require electrical power. However, the small space available in downhole logging tools due to the diameter of the borehole may limit the size of a power source such as a battery. Hence, it would be appreciated in the drilling industry if power sources for downhole applications could be improved.

SUMMARY

Disclosed is an apparatus for generating electricity. The apparatus includes: a flexural member configured to flex upon being subject to a vibration; a plurality of weight displacement systems disposed at the flexural member, each weight displacement system in the plurality being configured to displace a moveable weight upon receipt of a signal; a processor configured to provide a signal to each weight displacement system in order to achieve a desired resonant frequency of the flexural member; and an electricity generating device coupled to the flexural member and configured to generate the electricity upon flexing of the flexural member.

Also disclosed is a method for generating electricity. The method includes: applying a vibration to a flexural member causing the flexural member to vibrate; displacing one or more weights in a plurality of weight displacement systems disposed at the flexural member in order to achieve a desired resonant frequency of vibration of the flexural member; and generating the electricity with an electricity generating device coupled to flexural member.

Further disclosed is a non-transitory computer readable medium having computer executable instructions for generating electricity by implementing a method that includes: receiving a first signal related to flexing of a flexural member coupled to an electrical energy generating device configured to generate electricity due to flexing of the flexural member; and providing a second signal to one or more weight displacement systems disposed at the flexural member in order to achieve a desired resonant frequency of the flexural member.

BRIEF DESCRIPTION OF THE DRAWINGS

Referring now to the drawings wherein like elements are numbered alike in the several Figures.

DETAILED DESCRIPTION

While one or more embodiments have been shown and described, modifications and substitutions may be made thereto without departing from the spirit and scope of the invention. Accordingly, it is to be understood that the present invention has been described by way of illustrations and not limitation.

Figure 1:
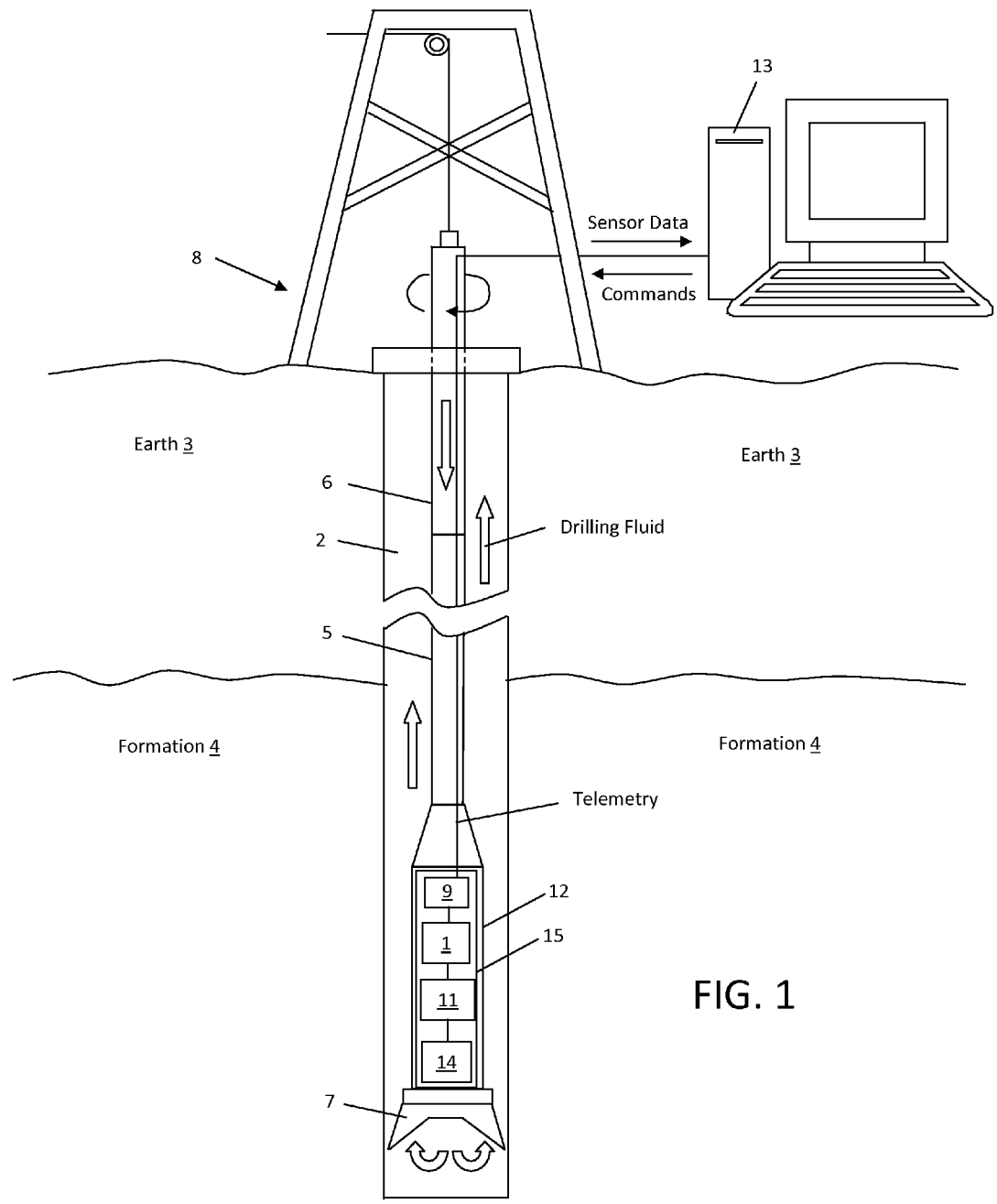
FIG. 1 illustrates a cross-sectional view of an exemplary embodiment of an apparatus including a self-tuning energy harvester that is built as a micro electro mechanical system (MEMS)

FIG. 1 illustrates a cross-sectional view of an exemplary embodiment of an apparatus including a self-tuning energy harvester that is built as a micro electro mechanical system (MEMS) 11. A downhole tool 12 disposed in a borehole 2 penetrating the earth 3, which includes an earth formation 4. The formation 4 represents any subsurface material of interest. The downhole tool 12 is configured to perform one or more types of measurements and is conveyed through the borehole 2 by a carrier 5. In the embodiment of FIG. 1, the carrier 5 is a drill string 6 in an embodiment known as logging-while-drilling (LWD). In an alternative embodiment, the carrier 5 can be an armored wireline in an embodiment known as wireline logging. Disposed at a distal end of the drill string 6 is a drill bit 7. A drilling rig 8 is configured to conduct drilling operations such as rotating the drill string 6 and thus the drill bit 7 in order to drill the borehole 2. In addition, the drilling rig 8 is configured to pump drilling fluid through the drill string 6 in order to lubricate the drill bit 7 and flush cuttings from the borehole 2. The downhole tool 12 includes a sensor 10 for performing the measurements. The sensor 10 is powered electrically by an energy harvester 11. Downhole electronics 9 may be configured to operate the downhole tool 12, process data obtained by the sensor 10, or provide an interface with telemetry for communicating with a computer processing system 13 disposed at the surface of the earth 3. Operating or processing operations may be performed by the downhole electronics 9, the computer processing system 13, or a combination of the two. Telemetry is configured to convey information or commands between the downhole tool 12 and the computer processing system 13.

The energy harvester 11 is configured to convert energy related to vibrations or movement of the downhole tool 12 into electricity. The generated electricity may be used to power downhole devices either directly or through an intermediary electrical energy storage device 14, which the energy harvester 11 charges. Non-limiting embodiments of the energy storage device 14 include a battery or an energy storage capacitor. The energy harvester 11 is coupled to a housing or structure 15 of the downhole tool 12 so that the energy of the vibrations or movement of the downhole tool 12 can be converted to electricity.

In one or more embodiments, the energy harvester 11 includes a flexural member that is configured to flex due to the vibrations or movement of the downhole tool 12. The flexing is used to generate electricity using any of several methods discussed below. It can be appreciated that the energy harvester 11 will be most efficient in generating electricity from the vibrations of the downhole tool 12 when the resonant frequency of the flexural member matches or is close to the frequency of the vibrations. In order to provide efficient energy conversion, the energy harvester 11 is configured to self-tune the resonant frequency of the flexural member to match or be close to the dominant frequency of the vibrations of the downhole tool 12.

In one or more embodiments, the energy harvester 11 is fabricated as a Micro-Electro-Mechanical-System (MEMS) using fabrication techniques similar to the techniques used to fabricate semiconductor devices such as integrated circuits. In one or more embodiments, the MEMS energy harvester 11 is monolithically fabricated by CMOS-like processes over a CMOS substrate/memory. It can be appreciated that as a MEMS device, the energy harvester 11 is fabricated as a micro-scale device and, thus, many MEMS energy harvesters 11, such as hundreds or thousands, may be disposed in the downhole tool 12. In embodiments where the tuning range of the resonant frequency is limited, the MEMS energy harvesters 11 can include groups, each group having a different tuning range, such that all the groups cover an expected vibration frequency range of the downhole tool 12.

Figure 2:
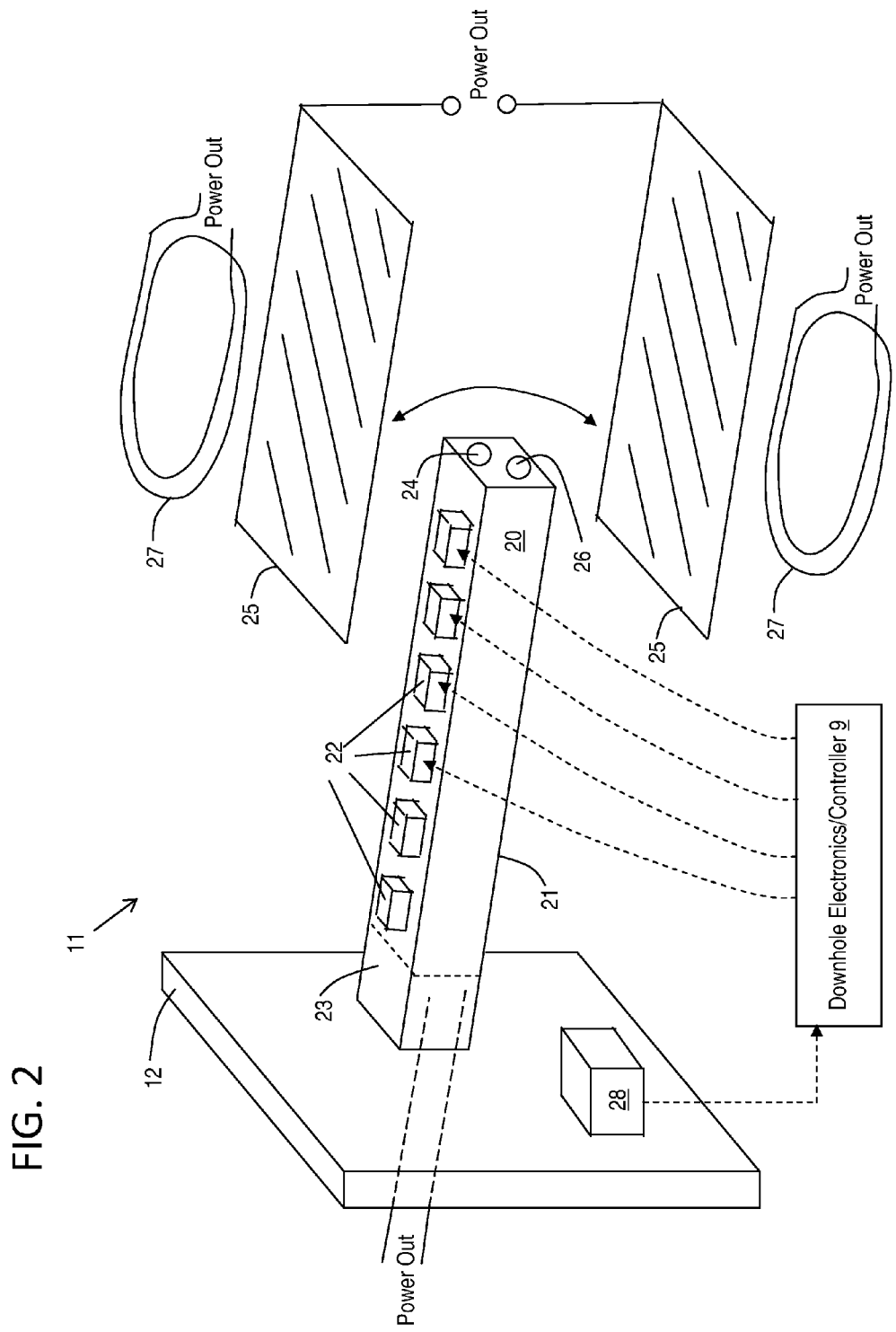
FIG. 2, depicts various aspects of the self-tuning MEMS energy harvester according to an embodiment of the present invention.

FIG. 2 depicts various aspects of the MEMS energy harvester 11 according to an embodiment of the present invention. The MEMS energy harvester 11 according to embodiments of the present invention adjusts its resonant frequency to maximize the electrical energy that it generates. The MEMS energy harvester 11 includes a flexural member 20 such as a beam 21 illustrated in the three-dimensional view in FIG. 2. The beam 21 is coupled to the downhole tool 12 such that the beam 21 will flex due to vibration or motion of the downhole tool 12. A plurality of displaceable weight cells 22 is disposed on or in the beam 21. Each displaceable weight cell 22 is separately controlled and configured to displace a weight along the longitudinal axis of the beam 21. By displacing the weight, the flexural characteristics of the beam 21 can be altered so that the resonant frequency of the beam 21 can be changed (i.e., tuned). In one or more embodiments, the beam 21 is one to two millimeters long although it can also be shorter or longer depending on the desired flexing characteristics.

Figure 3:
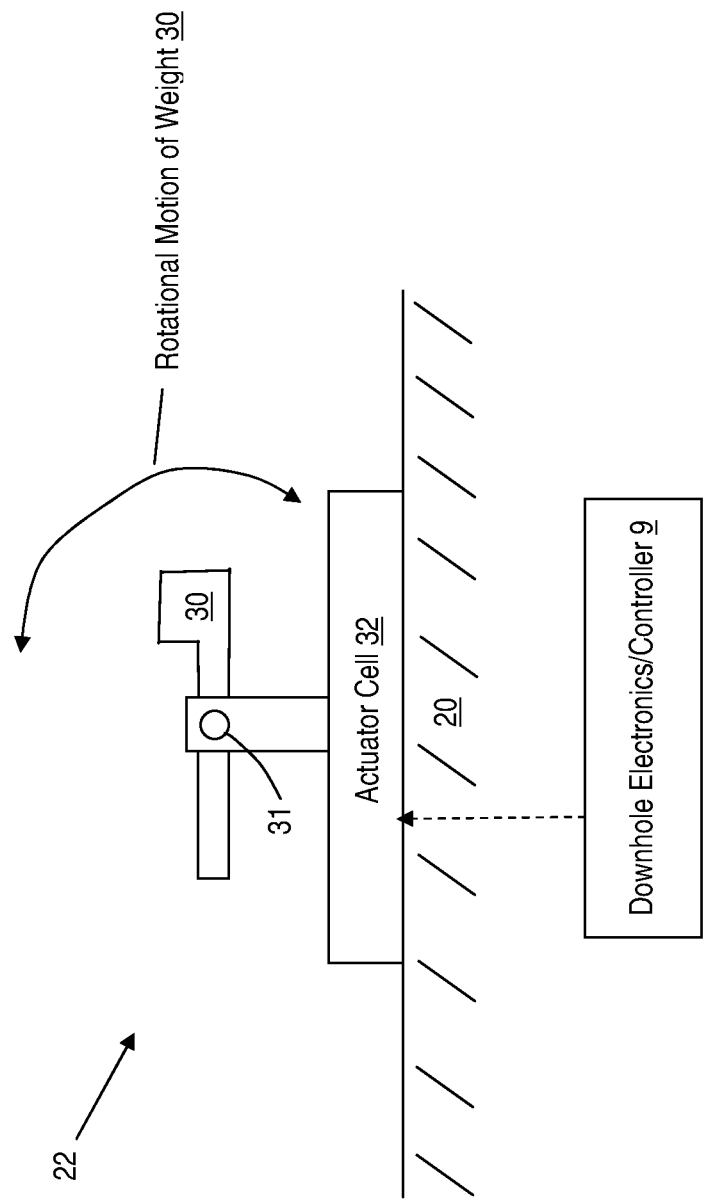
FIG. 3 depicts aspects of a weight displacement system included with the self-tuning energy harvester.

FIG. 3 depicts aspects of one embodiment of one weight displacement cell (WDC) 22 in a side cross-sectional view. The WDC 22 includes a moveable weight 30 that rotates about a shaft 31. The shaft 31 is generally perpendicular to the longitudinal axis of the beam 21 so that the weight 30 is displaced along the longitudinal axis when the weight 30 is rotated or flipped. The shaft 31 can also be offset from the perpendicular as long as the offset includes a vector component that is perpendicular to the longitudinal axis of the beam 21. In one or more embodiments, the weight 30 may have a uniform mass distribution and the shaft 31 is disposed offset from the center of gravity of the weight 30 so that as the weight 30 rotates, the mass of the weight will shift along the longitudinal axis of the beam 21. In one or more embodiments, the mass of the weight 30 is non-uniform with the shaft 31 disposed offset from the center of gravity of the weight 30. An actuator cell 32 is configured to rotate the moveable weight 30 using electrostatic attraction or repulsion produced by voltage differences developed between the weight 30 and the underlying actuating cell 32. In one or more embodiments, the downhole electronics 9 sends an electrical signal to the actuator cell 32 causing the moveable weight 30 to rotate. In one or more embodiments, the actuator cell 32 and the moveable weight 30 are configured for the weight 30 to maintain its position until the actuator cell 32 receives a signal to change the position.

It can be appreciated that the plurality of weight displacement cells 22 can be built similar to the Digital Light Processing™ technology developed by Texas Instruments for DLP™ televisions and digital projectors. For instance, the moveable weight 30 is similar to the moveable mirrors used to switch light on or off in the DLP™ devices and the actuator cell 32 is similar to the CMOS memory cell used to rotate the mirrors. Hence, the technology used for fabricating the DLP™ devices can be used to fabricate the flexural member 20, the plurality of weight displacement cells 22 disposed thereon, and related components.

Referring to FIG. 2, the energy harvester 11 can be configured to generate electricity in various ways. In the first way, the beam 21 or a section 23 of the beam 21 that flexes where it is connected to the downhole tool 12 is made of a piezoelectric material that will generate voltage as it flexes. In another way, an electric charge device 24 configured to produce an electric charge is disposed on the beam 21 and moves with the movement of the beam 21 between two metal plates 25. The movement of the electric charge generates electricity at the two metal plates 25. In an alternate embodiment, there may be only one metal plate 25, and the movement of the electric charge adjacent to the metal plate 25 would generate electricity. More than two metal plates 25 may also be used. In yet another way, a magnet 26 is disposed on the beam 21 and moves with the movement of the beam 21. One or more wire coils 27 adjacent to the magnet 26 are configured to generate electricity from the movement of the magnet 26 and, thus, the changing magnetic flux in the coils 27.

When the self-tuning MEMS 11 is first lowered into the borehole 2 in the BHA 12, its resonant frequency may have been set to match the dominant frequency (among a range of frequencies that may be present) in the borehole 2. However, vibration frequency of the downhole tool 12 in the borehole 2 depends on the nature and flow rate of fluid in the borehole 2 and, consequently, the vibration frequency may change over time. As a result, by adjusting its resonant frequency to match the new dominant vibration frequency, the self-tuning MEMS energy harvester 11 can maximize its energy harvesting potential. In one or more embodiments, the range of tuning is between 90 to 110 Hz, but is not limited to this range.

Several embodiments of the self-tuning process are described with the understanding that the examples are not meant to be limiting. In one embodiment, the dominant frequency is first determined so that the self-tuning MEMS energy harvester 11 can adjust its resonant frequency on that basis. This embodiment includes an accelerometer 28 disposed on the downhole tool 12. The accelerometer 28 is used to measure frequency (i.e., the dominant vibrational frequency present in the downhole tool 12 in the downhole environment). Based on the determined dominant frequency input into the downhole electronics 9, the downhole electronics 9 controls the actuating cells 32 to move the weights 30 to provide a weight distribution so that the resonant frequency of the flexural member 20 matches the determined dominant frequency. The downhole electronics 9 may determine the required position of each moveable weight 30 needed to achieve the desired resonant frequency by using a look-up table generated through experimentation or calibration in a laboratory environment prior to deployment of the self-tuning MEMS energy harvester 11 in the field. Alternatively, calculations such as those based on nodal mesh analysis can be used to determine the resonant frequency of the flexural member 20 for various configurations of the moveable weights 30.

Figure 4:
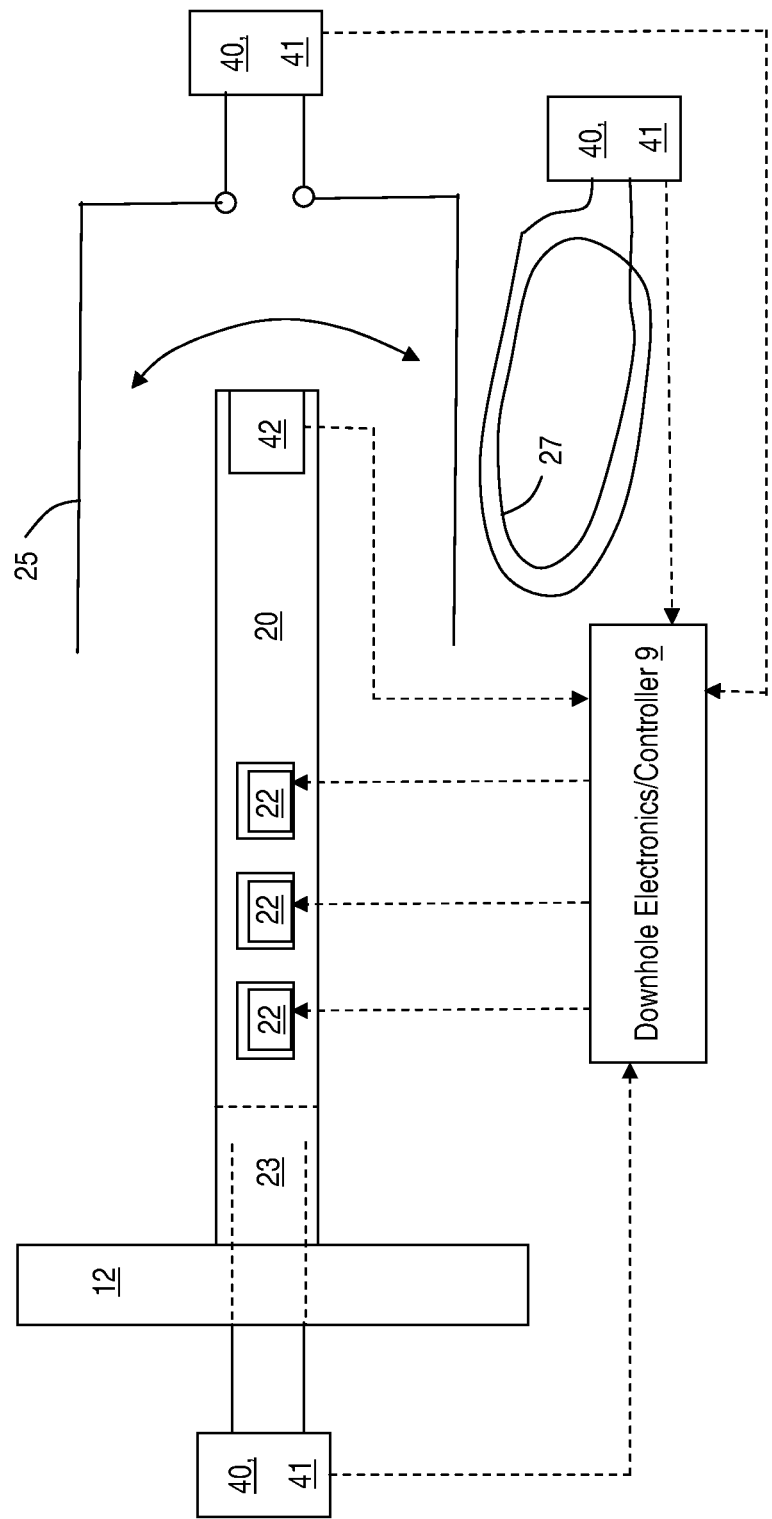
FIG. 4 depicts aspects of self-tuning to a desired resonant frequency of the energy harvester.

In another embodiment, the configuration of the moveable weights 30 required to achieve the required resonant frequency of the self-tuning MEMS energy harvester 11 is determined using feedback control based on various inputs. For example, in one embodiment, as illustrated in FIG. 4, the downhole electronics 9 may control the configuration of the moveable weights 30 of the WDCs 22 to maximize the voltage or power generated. In the embodiment shown in FIG. 4, the WDCs 22 are aligned along the centerline of the flexural member 20. This is an alternate arrangement to the one shown in FIG. 2, in which the WDCs 22 are along the outside of the flexural member 20. In this embodiment a voltage sensor 40 or power sensor 41 will provide feedback input to the downhole electronics 9, which will vary the positions of the moveable weights 30 until a maximum voltage or power generated is achieved. As another example, the downhole electronics 9 may control movement of the moveable weights 30 to maximize the amplitude of output of an accelerometer 42 disposed on the flexural member 20. The accelerometer 42 may also be fabricated as a MEMS device, as known in the art, within the MEMS energy harvester 11. The maximized output of the voltage sensor 40, the power sensor 41 or the accelerometer 42 relates to flexural member 20 having a weight configuration where the resonant frequency of the flexural member 20 matches the vibration frequency of the downhole tool 12.

It can be appreciated that the flexural member 20 can have various shapes that flex with vibration. For example, in one embodiment, the flexural member 20 can be shaped as a disk that rotationally flexes or oscillates with respect to a base such as the downhole tool. In this embodiment, the plurality of weight displacement systems (weight displacement cells 22) can be radially disposed about the disk such that the moveable weights can be radially extended in order to change the resonant frequency of the disk.

Figure 5:
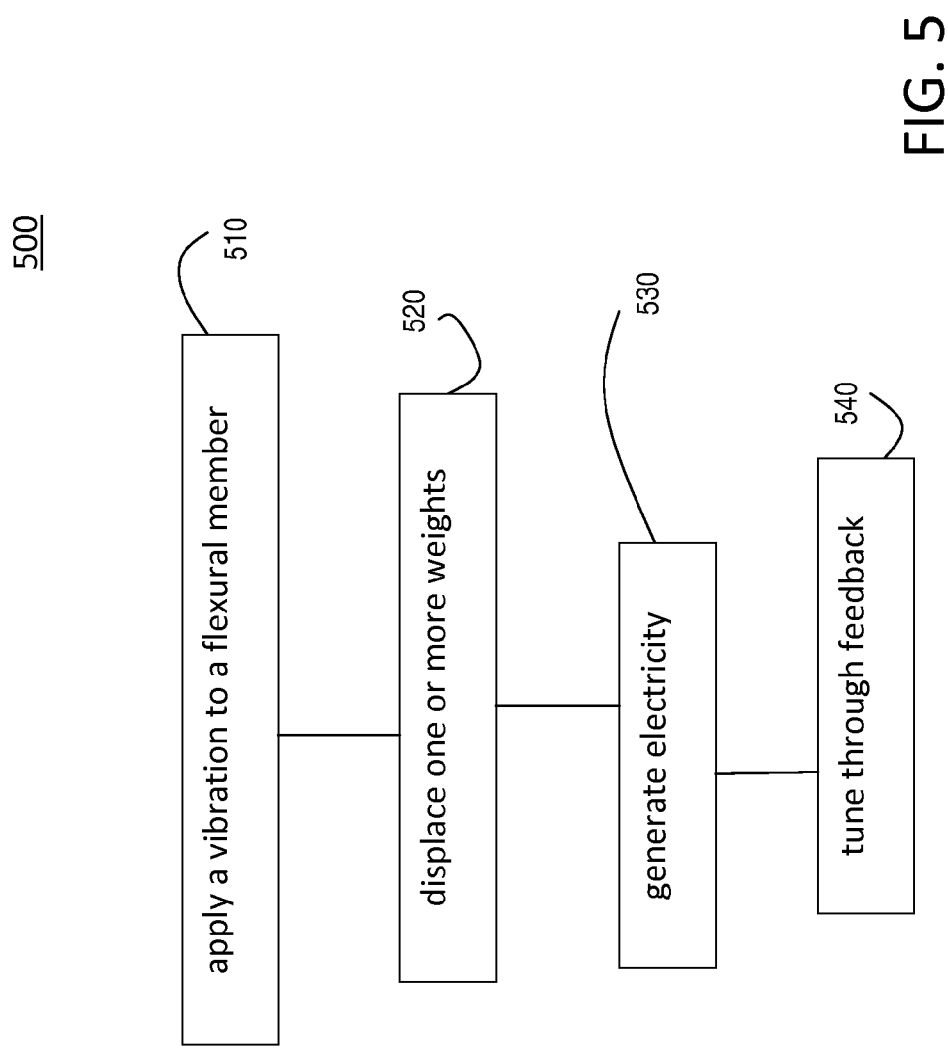
FIG. 5 depicts various processes involving the self-tuning energy harvester according to an embodiment of the invention.

FIG. 5 depicts various processes 500 involving the self-tuning energy harvester 11 according to an embodiment of the invention. At block 510, applying a vibration to a flexural member 20 causes the flexural member 20 to vibrate. At block 520, displacing one or more weights in a plurality of WDCs 22 disposed at the flexural member 20 facilitates tuning the resonant frequency of the flexural member 20 to the desired resonant frequency of vibration. At block 530, generating electricity with an electricity generating device coupled to the flexural member 20 includes generating the electricity by the various embodiments discussed above. At block 540, tuning through feedback includes monitoring a signal level proportional to the electricity generated and determining a new weight distribution pattern for the WDCs 22, as needed. In practice, each of the blocks may be processed in a continuous loop to maintain the self-tuning energy harvester.

In support of the teachings herein, various analysis components may be used, including a digital and/or an analog system. For example, the downhole electronics 9 or the computer processing system 13 may include the digital and/or analog system. Each system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art.

It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottomhole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "couple" relates to coupling a first component to a second component either directly or indirectly through an intermediate component.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An apparatus for generating electricity, the apparatus comprising:
    a flexural member configured to flex upon being subject to a vibration;
    a plurality of weight displacement systems disposed at the flexural member, each weight displacement system in the plurality being configured to displace a moveable weight relative to the flexural member upon receipt of a signal;
    a processor configured to provide a signal to each weight displacement system in order to achieve a desired resonant frequency of the flexural member; and an electricity generating device coupled to the flexural member and configured to generate the electricity based on flexing of the flexural member.

2. The apparatus according to claim 1, wherein the flexural member and the plurality of weight displacement systems are built as a micro-electro-mechanical-system (MEMS).

3. The apparatus according to claim 1, wherein each weight displacement system comprises:
the moveable weight configured to move in a direction that changes the resonant frequency of the flexural member; and
an actuating cell configured to move the moveable weight upon receipt of the signal from the processor.

4. The apparatus according to claim 3, wherein the actuating cell is configured to move the moveable weight through electrostatic attraction or repulsion.

5. The apparatus according to claim 3, further comprising a shaft coupled to the moveable weight wherein the moveable weight is configured to rotate about the shaft.

6. The apparatus according to claim 1, wherein the electricity generating device comprises a piezoelectric material that is at least a portion of the flexural member, the piezoelectric material being configured to generate the electricity upon flexing.

7. The apparatus according to claim 1, wherein the electricity generating device comprises:
an electric charge device disposed at the flexural member and configured to provide an electrical charge that moves upon flexing of the flexural member; and
a pair of metal plates configured to generate the electricity upon movement of the electrical charge between the pair of metal plates.

8. The apparatus according to claim 1, wherein the electricity generating device comprises:
an electric charge device disposed at the flexural member and configured to provide an electrical charge that moves upon flexing of the flexural member; and
a metal plate configured to generate the electricity upon movement of the electrical charge adjacent to the metal plate.

9. The apparatus according to claim 1, wherein the electricity generating device comprises:
a magnet disposed at the flexural member and configured to move with the flexing of the flexural member; and
a coil configured to generate the electricity upon movement of the magnet that changes a magnetic flux coupled to the coil.

10. The apparatus according to claim 1, wherein the flexural member comprises a beam.

11. The apparatus according to claim 1, further comprising an electrical energy storage device coupled to the electrical energy generating device.

12. The apparatus according to claim 1, wherein the flexural member is coupled to a carrier configured to be conveyed through a borehole penetrating the earth.

13. A method for generating electricity, the method comprising:
applying a vibration to a flexural member, based on vibration of a support of the flexural member, causing the flexural member to vibrate;
displacing one or more weights in a plurality of weight displacement systems disposed at the flexural member in order to achieve a desired resonant frequency of vibration of the flexural member, the one or more weights in the plurality of weight displacement systems being displaced relative to the flexural member; and
generating the electricity with an electricity generating device coupled to the flexural member.

14. The method according to claim 13, further comprising receiving a first signal related to flexing of the flexural member using a processor that provides a second signal to one or more selected weight displacement systems to displace one or more weights in order to achieve the desired resonant frequency.

15. The method according to claim 14, wherein the first signal is received from an accelerometer disposed on the support of the flexural member.

16. The method according to claim 14, wherein the first signal is received from a voltage sensor or power sensor coupled to the electrical energy generating device.

17. The method according to claim 14, wherein the first signal is received from an accelerometer disposed on the flexural member.

18. The method according to claim 14, further comprising conveying a carrier through a borehole penetrating the earth wherein the flexural member is disposed at the carrier.

19. A non-transitory computer readable medium comprising computer executable instructions for generating electricity by implementing a method comprising:
receiving a first signal related to flexing of a flexural member coupled to a electrical energy generating device configured to generate electricity due to flexing of the flexural member; and
providing a second signal to one or more weight displacement systems disposed at the flexural member to move relative to the flexural member in order to achieve a desired resonant frequency of the flexural member.

* * * * *